United States Patent

[11] 3,575,040

| [72] | Inventor | Hendrik Bosselaar |
| | | Amsterdam, Netherlands |
| [21] | Appl. No. | 752,108 |
| [22] | Filed | Aug. 9, 1968 |
| [45] | Patented | Apr. 13, 1971 |
| [73] | Assignee | Shell Oil Company |
| | | New York, N.Y. |
| [32] | Priority | Nov. 2, 1967 |
| [33] | | Great Britain |
| [31] | | 80316/67 |

[54] APPARATUS FOR TESTING A PIPELINE FOR LEAKS
2 Claims, 2 Drawing Figs.

[52] U.S. Cl. ................................................. 73/40.5
[51] Int. Cl. ..................................................... G01m 3/24
[50] Field of Search .......................................... 73/40, 40.5
(A), 49.1, 69; 340/239, 242; 346/33; 250/8.3

[56] References Cited
UNITED STATES PATENTS

| 2,940,302 | 6/1960 | Scherbatskoy | 73/40.5 |
| 3,162,505 | 12/1964 | Hall | 73/40.5X |

*Primary Examiner*—Louis R. Prince
*Assistant Examiner*—William A. Henry, II
*Attorneys*—Theodore E. Bieber and J. H. McCarthy

ABSTRACT: Apparatus for testing pipelines for leaks. The apparatus is passed through a pipeline by the flow of fluid. A hydrophone connected to the apparatus is in contact with the fluid and is sensitive to ultrasonic signals from the fluid arising from a leak. The ultrasonic signals appear on a recorder chart as a function of either the distance covered or a quantity related thereto. Pressure sensors are also attached to the apparatus, the signals of which can be for recording pressure indications as a function of either the distance covered or a quantity related thereto, and/or for actuating a switch device by which the recording equipment for ultrasonic signals can be partly or entirely switched off.

INVENTOR:
H. BOSSELAAR

| | | | | | | | | |
|---|---|---|---|---|---|---|---|---|
| D | L | 1 | 0 | 2 | 2 | 3 | 4 | 0 | 0 |
| | L | 1 | 0 | 2 | 2 | 3 | 4 | 0 | 0 |
| | L | 1 | 0 | 2 | 2 | 3 | 4 | 0 | 0 |
| | L | 1 | 0 | 2 | 2 | 3 | 3 | 5 | 0 |
| | L | 1 | 0 | 2 | 2 | 3 | 3 | 5 | 0 |
| | L | 1 | 0 | 2 | 2 | 3 | 3 | 5 | 0 |
| | L | 1 | 0 | 2 | 2 | 3 | 3 | 5 | 0 |
| | L | 1 | 0 | 2 | 2 | 3 | 3 | 4 | 0 |
| C | M | 1 | 0 | 1 | 6 | 0 | 5 | 1 | 0 |
| | M | 1 | 0 | 1 | 6 | 0 | 5 | 1 | 0 |
| | M | 1 | 0 | 1 | 6 | 0 | 5 | 1 | 0 |
| | M | 1 | 0 | 1 | 6 | 0 | 5 | 1 | 0 |
| | M | 1 | 0 | 1 | 6 | 0 | 5 | 0 | 0 |
| | M | 1 | 0 | 1 | 6 | 0 | 5 | 0 | 0 |
| B | L | 1 | 0 | 1 | 6 | 0 | 5 | 0 | 0 |
| | L | 1 | 0 | 1 | 6 | 0 | 5 | 0 | 0 |
| | L | 1 | 0 | 1 | 6 | 0 | 4 | 5 | 0 |
| | L | 1 | 0 | 1 | 6 | 0 | 4 | 5 | 0 |
| | L | 1 | 0 | 1 | 6 | 0 | 4 | 5 | 0 |
| A | M | 1 | 0 | 0 | 2 | 1 | 5 | 4 | 0 |
| | M | 1 | 0 | 0 | 2 | 1 | 5 | 3 | 0 |
| | M | 1 | 0 | 0 | 2 | 1 | 5 | 3 | 0 |
| | M | 1 | 0 | 0 | 2 | 1 | 5 | 3 | 0 |

FIG. 2

INVENTOR:
H. BOSSELAAR

APPARATUS FOR TESTING A PIPELINE FOR LEAKS

BACKGROUND OF THE INVENTION

The invention relates to an apparatus for examining a pipeline for leaks by acoustic procedures, which apparatus can be transported through the pipeline with the flow of matter through that pipeline. As regards outward appearance such an apparatus may resemble a container whose diameter is smaller than the inner diameter of the pipeline, which container is equipped with one or more collars which do not touch the inner wall of the pipeline and with wheels which travel along that inner wall. By the flow of matter through the pipeline such an apparatus is carried along with little or no slip.

A known technique is to provide the apparatus with equipment for the observation, amplification, selection and recording of ultrasonic signals against the background noise in the pipeline and that in such a way that ultrasonic signals arising from a leak can appear on a recorder chart in a recognizable form and as a function of either the distance covered or a quantity related thereto. This equipment is present in the aforementioned container, with the exception of a hydrophone for the observation of ultrasonic vibrations, which is fitted to the outside of the container. On its journey through the pipeline the apparatus, when approaching a leak, observes an increase in the noise intensity and, after having passed the leak, when moving away from it, observes a decrease. The rectified signal is peak shaped. When the peak is recorded as a function of time, then, with the aid of the time schedule of the quantity of matter transported, which in itself is known, the location of the leak can be determined. Mere printing of the time on the recorder chart when a leak is being passed is sufficient. Favorable results are obtained when the equipment is fitted for the observation and processing of vibrations at approximately 35 kHz. For, the ratio between the strength of signal arising from a leak and the strength of background noise is then at maximum, as a result of which the limit with respect to the detectability of leaks is shifted to a minimum value.

In addition to establishing the presence of a leak and the determination of the location thereof, the possibility of establishing the absence of leaks with certainty is of at least equal importance. It has already been proposed that at regular intervals of time a check be made on the proper performance of the equipment during the journey of the apparatus through the pipeline, which journey may extend over many days. This may be done with the aid of sources of vibrations, installed on the pipeline in known places, which are capable of generating acoustic vibrations whose intensity and frequency are such that these vibrations can be observed and recorded by the aforementioned equipment. If all the sources of vibrations installed outward are recorded by the equipment, then one has a high degree of certainty that the equipment functioned properly.

It has now been found that there may be conditions during the journey of the apparatus through the pipeline at which leak signals are too weak to be observed. As a result, it will then be more difficult to draw conclusions from the recorder chart as regards the presence or absence of leaks. The invention provides the means by which important improvements in this respect can be obtained.

SUMMARY OF THE INVENTION

According to the invention an apparatus for examining a pipeline for leaks by acoustic procedures which can be transported through the pipeline with the flow of matter through that pipeline and which is provided with equipment for the observation, amplification, selection and recording of ultrasonic signals against the background noise in the pipeline and that in such a way that ultrasonic signals arising from a leak can appear on a recorder chart in a recognizable form and as a function of either the distance covered or a quantity related thereto is provided with a pressure-sensitive element capable of reacting to the pressure in the pipeline, the signal of which can be used for recording pressure indications as a function of either the distance covered or a quantity related thereto during the transport of the apparatus through the pipeline, and/or for actuating a switch device by which the aforementioned measuring and recording equipment for ultrasonic signals can be partly or entirely switched on or switched off.

The present invention is based on the discovery that after the line pressure has dropped below a lower limit the ultrasonic signal from a leak becomes too weak to be observed with the aid of the equipment. If pressure indications are recorded as a function of time, then, when judging the recorder chart at the end of the journey, it can be established during what period, or periods, it was impossible for a leak, if present, to be recorded. With the aid of the time schedule of the quantity of matter transported, which is known, the pipeline sections in question can be determined from the recorder chart. Then one will have certainty about which part of the pipeline in fact has been examined, which yields a more reliable picture of the condition of the pipeline than that obtained when from the unavoidable absence of a leak recording it was concluded that there was no leak.

In general it is sufficient to record the condition of the pressure being higher or lower than a specific value set beforehand. To this end a bistable element may be present whose position is determined by the sign of the difference between the pressure and the set value beforehand, which position can be recorded as an indication of the pressure. The bistable element may be a spring-loaded diaphragm that operates a microswitch. The diaphragm can follow the pressure in the pipeline. The set value may amount to 5-atmospheres gauge for a pipeline carrying crude oil. Each passage upward or downward through the set value may conveniently be recorded together with the time. In doing so it is of importance to provide for a dead zone of, for instance, 1 atmosphere, in order that the influence of small variations in the pressure, which might result in frequent recording, be excluded.

The component serving the purpose of recording is preferably so designed that a pressure indication is recorded simultaneously with each recording of a selected ultrasonic signal.

Naturally, the simultaneous printing of pressure indication and ultrasonic signal increases the reliability of the recording, even though the relevant pressure condition can already be read from the independently recorded pressure indications. Periods of low pressure may be caused by temporary decreases in pump output. Low-pressure conditions may also occur in sections of pipelines passing through mountain ranges, notably in sections with a falling slope in the direction of the flow of matter. It is even possible for conditions there to be such that the flow of matter is maintained exclusively by gravity.

Important advantages may be obtained during certain stages of the process of transport when the signal from the pressure-sensitive element is used to actuate a switch device by which the measuring and recording equipment for ultrasonic signals is entirely or partly switched on and switched off. Such a switch device may be connected to the aforementioned bistable element in such a way that a switching off action can take place when the difference between the pressure and a set value becomes negative and a switching on action can take place when that difference becomes positive. From practical tests it has been found that during the operation of filling the trap by which the apparatus for examining the pipeline for leaks is introduced, recordings occur frequently. Apparently, owing to splashing and eddying of the liquid during the filling, ultrasonic vibrations of sufficient intensity are generated in the range of 35 kHz. During the filling period the apparatus is subjected to a low pressure, the value of which is at any rate below the aforementioned set value. When the apparatus is placed in a trap for introduction into the pipeline, a switch capable of switching the recording component on and off is put in the off-position. Then it is impossible for recordings to take place as long as the trap for introduction of the apparatus is not entirely filled. When the trap is reaching the filled condition, then the pressure increases rapidly, as a result of which the position of the said switch is changed automatically, so that the recording component is switched on. Thus it is prevented that a large number of unnecessary recordings are made.

It is also possible for the entire equipment for the observation etc. of ultrasonic vibrations to be switched off at too low a pressure in the pipeline and to be switched on again when the pressure has become sufficiently high. Then the advantage is obtained that the batteries provided to supply power to the equipment during the journey, often extending over many days, are saved during the time when leak signals cannot be recorded anyway. This is of importance in the case of a temporary, unexpected stoppage of the transport of matter through the pipeline. When the transport is resumed, the equipment is switched on again owing to the increase in pressure. Likewise, power is not unnecessarily withdrawn from the batteries during the passage through the so-called free-falling sections in the case of pipelines traversing mountain ranges.

BRIEF DESCRIPTION OF THE DRAWINGS

The invention will now be further elucidated with reference to the drawing wherein:

FIG. 2 shows an example of a recorder chart after an inspection journey of the apparatus according to the invention through a pipeline over a distance of 153 km.

In FIG. 1 a hydrophone 10 is in contact with the matter or fluid in the pipeline and is sensitive to ultrasonic vibrations therein. The signal from hydrophone 10 is passed to selective or band-pass amplifier 12, which amplifies signals in the frequency band of 35 kHz.±2 kHz. The output signal of amplifier 12 passes to an integrator 14 and to a demodulator 16. The integrator 14 has a time constant of about 1.7 seconds, owing to which transient disturbances are eliminated. The change in amplitude of the ultrasonic signal from a leak as a result of that leak being passed by the equipment is reflected in the output signal integrator 14. This output signal passes to a pulse generator 18 which supplies a pulse of a specific width and magnitude when a specific value of the output signal of integrator 14 is exceeded. Pulse generator 18, and also pulse generators 32, 46, 48 and 62 to be mentioned hereinafter, may consist of a flip-flop circuit. The pulse passes to an OR gate 20. This gate is only capable of allowing current to pass in one direction. The current allowed to pass goes to the recording equipment, namely to printing means 22 thereof. In printing means 22 there is present a wheel containing three characters that can be printed. Under the influence of the current pulse from OR gate 20, the wheel is turned from the position to the adjacent position. The output signal of the pulse generator 18 also passes to a switch or control gate 24 that is capable of taking two positions—in a way to be specified hereinafter—as a result of which the signal from pulse generator 18 is either passed on to the print control means 26 or blocked. If the signal from integrator 18 is passed to print control means 26, the output therefrom puts the printing mechanism of the recording equipment into operation. The position of the wheel in printing means 22 as well as the positions of the wheels—to be discussed hereinafter—in printing means 52 and 64 are printed on paper, after which the paper is moved on. After the printing operation a reset relay 28 passes a signal to printing means 22, as a result of which the wheel present in that component is put back into the starting position. The relay 28 likewise supplies a signal to the integrator 4 and to the integrator 30, to be discussed hereinafter, which results in these integrators being discharged to an initial value.

Figure 1:
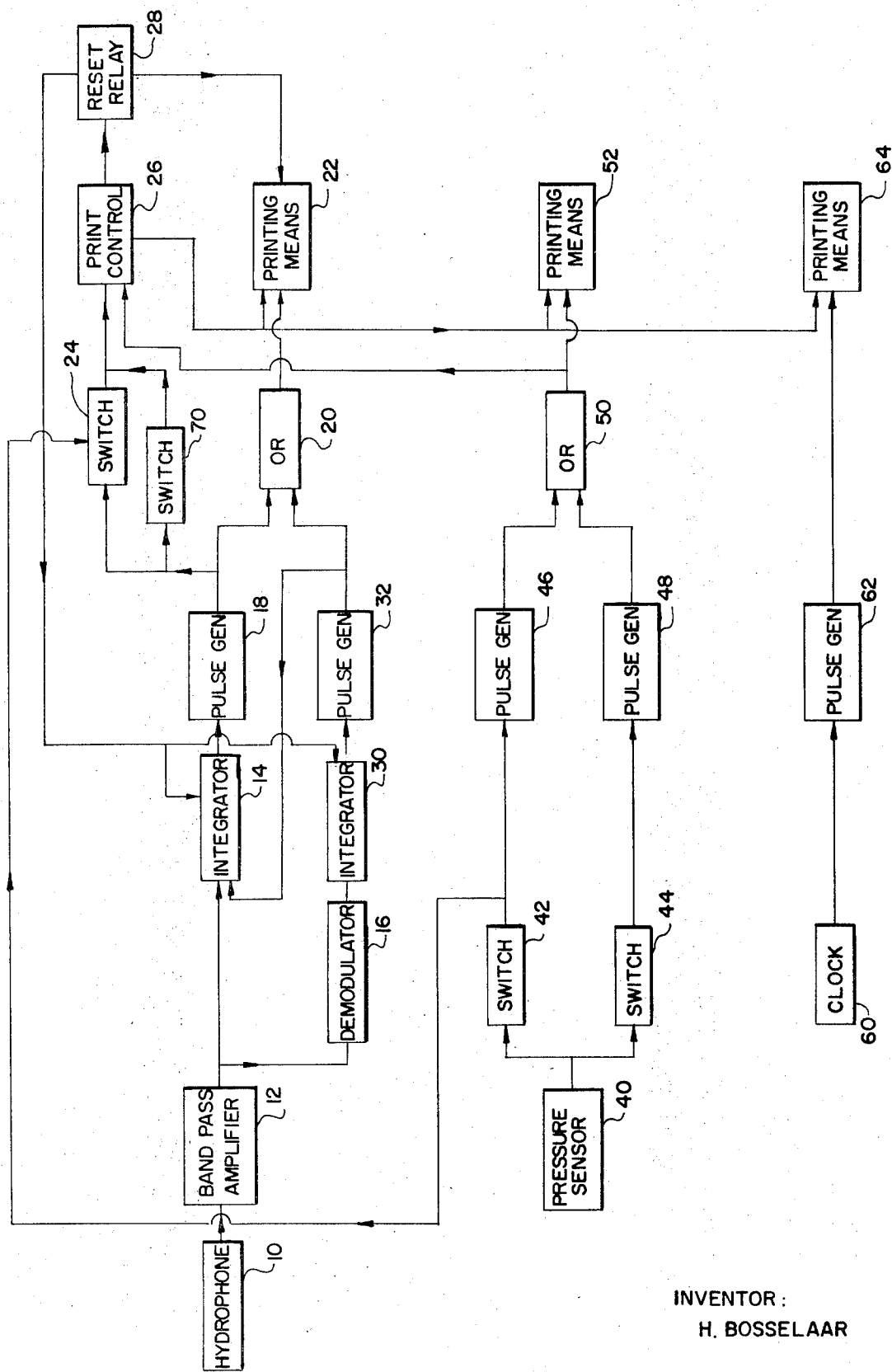
FIG. 1 shows a detailed block diagram of the invention.

Thus, with the aid of the part of the equipment discussed so far, under the influence of an ultrasonic input signal, selected on the basis of frequency and amplitude variation, a printing mechanism is actuated and a specific character printed on paper, whereupon that part of the equipment is put back into the starting condition.

Along the pipeline, in known places, sources of vibration may be installed to which the equipment can respond if operating properly as it passes by. The sources of vibration supply a frequency in the aforementioned frequency band of 35 kHz.±2 kHz., but now amplitude-modulated with a frequency of 70 Hz. The demodulator 16 separates the modulated signal from the carrier and supplies it to integrator 30 that has a time constant of 1.5 seconds. The integrated signal passes to pulse generator 32, which supplies a pulse to OR gate 20. In addition, however, the output signal of the pulse generator 32 is supplied to the input of integrator 14. As a result, two current pulses, separated by a short time interval, are allowed to pass through OR gate 20 to printing means 22 thereby causing the wheel present therein to be turned two positions from the starting position and causing a different character to be printed from that printed in the case of the wheel being turned under the influence of a signal that has not been amplitude-modulated with a frequency of 70 Hz. In this way ultrasonic signals observed are differentiated as regards their origin, namely an installed source of vibrations or a leak.

As well as the hydrophone 10, a pressure-sensitive element 40 is in contact with the matter or fluid in the pipeline. The pressure-sensitive element may be a diaphragm that is loaded by a spring. Under the influence of a drop in the pressure in the pipeline below a specific value, switch 42 is put into the on position and switch 44 put into the off position. However, when the pressure rises, above the specific value, switch 42 will be put into the off position and switch 44 will be put into the on position. Thus, at low pressure the signal from pressure-sensitive element 40 passes to a pulse generator 46 and at high pressure it passes to a pulse generator 48. An OR gate 50 allows in either case a current pulse to pass to printing means 52 wherein a wheel is present which under the influence of the incoming current pulse can be turned from an initial position to the adjacent position. It is possible for the wheel to take two positions or an even number of positions greater than two. For each position there is a corresponding character that can be printed. There are only two characters, which occur alternately. One character indicates that the pressure is lower than the set value, the other character that the pressure is higher than that set value. If the wheel is in the correct position at the beginning of the observations, then it need not be turned back after printing. The output signal of the OR gate 50 likewise passes to print control means 26. Thus the pressure indication signal is printed as soon as the positions of the switches 42 and 44 are changed. In addition, the pressure indication signal is printed when an ultrasonic signal originating from a leak or from a modulated source of vibrations is printed.

A clock 60 passes a signal to a pulse generator 62 at a constant time interval of, for instance, 10 seconds. Under the influence of the pulses from generator 62 one or more wheels containing characters, which are present in printing means 64, are turned from an initial position to an adjacent position. The position of the wheels in question indicates the time in hours, minutes and seconds after the beginning of the journey of the equipment through the pipeline. The time is printed only when the print instruction device 26 puts the recording equipment into operation. The location of a leak can be determined from the time recordings with the aid of the known pumping schedule. A check on this way of determining the location follows from the comparison of the thus calculated location of a modulated source of vibrations and the known location thereof.

When switch 42 is in the on position, i.e., when the pressure in the pipeline is lower than a set value, then, in addition, a signal is passed to switch or control gate 24. As a result, switch 24 is put into the position where the signal from the pulse generator 18 is blocked. Then printing of a signal arriving via OR-gate 20 does not take place any longer. However, printing of the pressure indication signal from OR gate 50, with the time indication belonging thereto, does take place. Thus, the pressure condition in the pipeline is known at any moment and, hence, these data can be used, in the manner discussed hereinbefore, in judging the recorder chart. Switch 24 will, for instance, be in the blocked position during the operation of filling the trap for introduction of the apparatus into the pipeline. If one wishes to block the signal arriving via switch 42 during this filling period only and not during the journey of the equipment, then switch 24 should be a holding switch, as a result of which this switch remains in the on position after having reached this position for the first time.

If it is preferred to carry out an inspection of the pipeline under the condition of a permanent connection being present between the output of the OR-gate 20 and the print control means 26, switch 70 may be manually switched so that switch 24 is short-circuited. The pressure indication signal is then unable to prevent the printing of signals which arrive via the hydrophone. The pressure indication signal is always printed, though.

If, under conditions of too low a pressure in the pipeline, one wishes the equipment to be largely switched off, then the switch 24 may be provided with extra contacts by which, for instance, the power supply for the hydrophone circuit can be switched off as long as the pressure goes below the set point. When the pressure rises above the set value this part of the equipment is switched on again. This results in the life of the batteries being prolonged.

FIG. 2 gives an example of a recorder chart. The equipment was transported over a distance of 153 km. through a pipeline carrying crude oil. The pipeline was provided in two places with artificial leaks and in two places with modulated sources of ultrasonic vibrations. Column I gives the print resulting from an ultrasonic signal. An L indicates that the signal was generated by a leak, an M that the signal was generated by a modulated source of vibrations. Column II gives the pressure indication. A 1 indicates that the pressure was higher than 5 atm. gauge, a O that the pressure was lower than 5 atm. gauge. The columns III, IV and V together indicate the time in hours, minutes and seconds, in that order. On the recorder chart the time scale is such that time proceeds from bottom to top. At the beginning of the journey the time indication was 2 hours, 15 minutes, 30 seconds.

Right at the beginning, at 0 km., a modulated source of vibrations was present. This source was recorded during 10 seconds in part A of the recorder chart.

A leak was present at 51.4 km. This recording lasted 10 seconds. The relevant part of the recorder chart - B - starts at 16 hours, 4 minutes and 50 seconds.

Next, very close to this a modulated source of vibrations was present. In part C the recordings concerned occur during a period of 10 seconds.

Finally, a leak was present at 153 km., near the terminal station. In the part D of the recorder chart the recordings in question occurred during 20 seconds, starting at 22 hours, 33 minutes and 40 seconds. The pressure was always higher than 5 atm. gauge.

It was found that from the calculation with the aid of the pumping schedule the locations of the leaks and the sources of vibrations could be determined within ±100 m.

I claim:

1. An apparatus adapted to pass through the inside of a fluid carrying pipeline to establish what portion of the pipeline is without leaks, comprising:

a vibration sensing means, said vibration sensing means being mounted on a container and adapted to detect ultrasonic vibrations;

a first printing means, said first printing means operatively attached to said vibration sensing means and adapted to record the output thereof;

a pressure sensing means, said pressure sensing means mounted on said container and adapted to detect the pressure of the fluid in the pipeline;

a second printing means, said second printing means operatively attached to said pressure sensing means and adapted to record the output thereof;

a clock, said clock adapted to generate a periodic signal;

a third printing means, said third printing means connected to said clock and adapted to record said periodic signals; and a printing means controller with two inputs, said recording means controller having one input connected to the output of said vibration sensing means and the other input connected to the output of said pressure sensing means the output of said recording means controller being connected to said first, second, and third recorders and adapted to cause said first, second, and third recording means to record when an output signal is produced therefrom, said recording means controller being adapted to produce an output signal upon receiving a signal at either of its inputs.

2. A system disposed to pass through the inside of a fluid carrying pipeline by means of a container and adapted for certifying that a portion of the pipeline is without leaks, comprising a hydrophone, said hydrophone mounted on said container and adapted to produce an electrical output portional to acoustical signals present in the fluid;

a band-pass amplifier, said band-pass amplifier having its input connected to the output of said hydrophone and adapted to pass and amplify a portion of the output signal of said hydrophone;

a first integrator, said integrator having first, second, and third inputs, said first input being connected to the output of said band-pass amplifier and adapted to integrate the output thereof;

a first pulse generator; said pulse generator having its input connected to the output of said integrator and adapted to generate a pulse when the output of said integrator reaches a predetermined level;

a demodulator; said demodulator having its input connected to the output of said band-pass amplifier and adapted to demodulate the signal therefrom;

a second integrator, said second integrator having a first and second input, said first input being operatively connected to the output of said demodulator to integrate the output thereof;

a second pulse generator, said second pulse generator having its input connected to the output of said second integrator and a plurality of outputs, one of said outputs being operatively connected to said second input of said first integrator;

an OR circuit, said OR circuit having a first and second input, said first input being connected to the output of said first pulse generator and said second input being connected to the output of said second pulse generator;

a switching means, said switching means having a first and second input, said first input being operatively connected to the output of said first pulse generator;

a print control means, said print control means having a first and second input, said first input being operatively connected to the output of said switching means;

a first printing means, said first printing means having a first, second and third input, said first input being operatively connected to the output of said OR circuit, said second input being operatively connected to the output of said print control means, said first printing means being adapted to print three characters, said characters being determined by the number of pulses received from said OR circuit to an initial state;

a reset relay, said reset relay having its input connected to the output of said print control means; and its output connected to said third input of said first printing means, said third input of said first integrator, and said second input of said second integrator, said reset relay being adapted to reset said first printing means, and said second integrators to their initial conditions upon receiving an input signal from said print control means;

a pressure sensor, said pressure sensor adapted to generate an output signal proportional to the pressure of said fluid in said pipeline;

a first and second switch, said first and second switch having their inputs operatively connected to the output of said pressure sensor the output of said first switch being connected to the second input of said switching means, said first and second switch being adapted to operate such that when the pressure in said fluid drops below a specific value said first switch is put into the on position and said second switch is put into the off position while when the pressure in said fluid rises above said specific value, said first switch is put into the off position and said second switch is put into the on position;

a third pulse generator, said third pulse generator having its input connected to the output of said first switch and adapted to generate a pulse when said first switch is put into the on position;

a fourth pulse generator, said fourth pulse generator having its input connected to the output of said second switch and adapted to generate a pulse when said second switch is in the on position;

a second OR circuit, said second OR circuit having a first and second input, said first input being connected to the output of said third pulse generator and said second input being connected to the output of said fourth pulse generator, the output of said OR circuit being operatively connected to the second input of said print control means;

a second printing means, said second printing means having a first and second input, said first input being operatively connected to the output of said second OR circuit and said second input being operatively connected to the output of said print control means, said second printing means being capable of printing two characters, one character indicating that the pressure in said fluid is below a predetermined level and the other character indicating that the pressure of said fluid is above said predetermined level, said printing means being adapted to print when receiving a signal from said print control means;

a clock, said clock adapted to generate periodic output signals;

a fifth pulse generator, said fifth pulse generator having its input connected to the output of said clock pulse and adapted to generate a pulse upon receiving an output signal from said clock; and a third printing means, said third printing means having as its input the output of said fifth pulse generator and adapted to print elasped time.

PO-1050
(5/69)

UNITED STATES PATENT OFFICE
CERTIFICATE OF CORRECTION

Patent No.     3,575,040          Dated    APRIL 13, 1971

Inventor(s)    HENDRIK BOSSELAAR

It is certified that error appears in the above-identified patent and that said Letters Patent are hereby corrected as shown below:

On the first page of patent, item 31 refers to the priority application as Great Britain Application Serial No. 80316/67.

The correct Serial No. is 50316/67

Signed and sealed this 7th day of March 1972.

(SEAL)
Attest:

EDWARD M. FLETCHER, JR.
Attesting Officer

ROBERT GOTTSCHALK
Commissioner of Patents